United States Patent [19]

Cohen

[11] 4,038,473

[45] July 26, 1977

[54] PROCESS FOR CLEANING POLYMERIZATION REACTORS

[75] Inventor: Louis Cohen, Avon Lake, Ohio

[73] Assignee: The B. F. Goodrich Company, Akron, Ohio

[21] Appl. No.: 622,679

[22] Filed: Oct. 15, 1975

[51] Int. Cl.$^2$ .......................... C08F 2/20; C08F 14/06
[52] U.S. Cl. .......................................... 526/62; 134/2; 528/484
[58] Field of Search ............... 134/2; 526/62; 528/484

[56] References Cited

U.S. PATENT DOCUMENTS

| 3,145,178 | 8/1964 | Dupré et al. | 134/2 |
|---|---|---|---|
| 3,145,180 | 8/1964 | Dupré et al. | 134/2 |
| 3,515,709 | 6/1970 | Nelson et al. | 526/62 |
| 3,669,946 | 6/1972 | Koyanagi et al. | 526/62 |
| 3,865,628 | 2/1975 | Callahan et al. | 134/2 |
| 3,915,944 | 10/1975 | Burgess et al. | 526/62 |

*Primary Examiner*—Alan Holler
*Attorney, Agent, or Firm*—J. Hughes Powell, Jr.

[57] ABSTRACT

In the aqueous polymerization of vinyl chloride and vinylidene chloride polymers and copolymers in reactors having exposed metal surfaces, undesirable thin polymer build up is noted on the metal surfaces exposed to the polymerization media. Such polymer build up is substantially reduced if before the polymerization the reactor is first mechanically cleaned to remove visible polymer deposits and then cleaned of organic materials adsorbed on the metal surfaces; and thereafter between polymerization charges as required, by treatment with a hot-alkali detergent mixture to remove organic residues from the surface of said metal surfaces.

11 Claims, No Drawings

PROCESS FOR CLEANING POLYMERIZATION REACTORS

BACKGROUND OF THE INVENTION

Vinyl chloride, either alone or with other vinylidene comonomers, is normally polymerized in water in the presence of suspending, dispersing or emulsifying agents and free radical forming catalysts in glass or metal, usually stainless steel, reactors. In such polymerizations, particularly, the suspension systems, polymer is deposited on stainless steel or other metal surfaces of a nature not normally noted when the polymerizations are conducted in the presence of glass. This polymer build up normally begins as a thin layer, often referred to as paper build up, which with successive charges, becomes increasingly heavy, of a sandy and often hard nature. This is also a problem in glass-lined reactors where the glass has been worn, eroded and scratched and where metal parts and components are exposed to the polymerization media. This polymer build up must be removed from the polymer surface and this may require entry of the reactors and removal by hand. The industry requires methods to prevent this build up on metal surfaces exposed to the polymerization medium.

SUMMARY OF THE INVENTION

Polymer build up on metal surfaces exposed to aqueous vinyl chloride polymerization media is substantially reduced if prior to the polymerization the metal reactor surfaces are cleaned so as to remove all organic contaminants as shown by water wettability of the cleaned metal surfaces. Thereafter the reactor is cleaned as required to remove organic contaminants from the metal reactor surfaces. This cleaning is readily accomplished by agitating in the polymerization reactor a hot solution containing an alkali metal compound and a surface active agent.

DETAILED DESCRIPTION OF THE INVENTION

The process of the invention is normally used in the polymerization of vinyl chloride or vinylidene chloride in pressure vesels with water in the presence of dispersing, suspending or emulsifying agents and free radical forming catalysts, normally, peroxy catalysts. The polymerizations are normally conducted in the range of about 30° to 60° C. but as is well known, may be conducted at higher or lower temperatures as from about 0° to about 100° C.

The invention is of particular value when applied to the polymerization of a vinyl halide or vinylidene halide monomer in water, alone or in mixtures thereof, with other olefinically unsaturated or vinylidene comonomers. The vinyl or vinylidene halide monomers correspond to the structural formula.

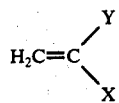

wherein X is a halogen selected from the group consisting of chlorine, bromine or fluorine and Y is hydrogen or a halogen the same as defined for X. An especially useful vinyl halide monomer of the above type is vinyl chloride. The amount of vinyl chloride monomer will range from about 40% or more, preferably about 55%, to 100% by weight of the total monomers polymerized.

In addition to the vinyl chloride monomer, one or more other polymerizable olefinically unsaturated, vinylidene comonomers preferably containing at least one terminal methylene group ($H_2C=C<$) may also be employed therewith. Usually less than about 50% by weight of these polymerizable comonomers is present. Copolymerizable comonomers include dienes of 4 to 10 carbon atoms; ethylidene norbornene and dicyclopentadiene; α-olefins such as ethylene, propylene, isobutylene, butene-1 and 4-methylpentene-1, preferably containing 1 to 8 carbon atoms; vinyl bromide, vinylidene chloride, vinyl fluoride; vinyl esters such as vinyl acetate, vinyl laurate and vinyl chloroacetate; vinyl aromatics such as styrene, chlorostyrene, α-methyl styrene, vinyl toluene and vinyl naphthalene; alkyl vinyl ethers and ketones such as methyl vinyl ether, isobutyl vinyl ether, N-butyl vinyl ether, chloroethyl vinyl ether, methyl vinyl ketone and isobutyl vinyl ether; α,β-olefinically unsaturated nitriles such as acrylonitrile, methacrylonitrile; cyanoalkyl acrylates such as α-cyanomethyl acrylate and the α-, β- and γ-cyanopropyl acrylates; olefinically unsaturated carboxylic acids as acrylic acid, methacrylic acid and the like; esters of olefinically unsaturated carboxylic acids including α,β-olefinically unsaturated acids such as methyl acrylate, ethyl acrylate wherein the alkyl groups contain 1 to 8 carbon atoms, chloropropyl acrylate, methyl methacrylate, ethyl methacrylate, 2-ethylhexyl acrylate, cyclohexyl acrylate, henyl acrylate, glycidyl acrylate, glycidyl methacrylate, ethoxyethyl acrylate, esters of maleic and fumaric acid, amides of the α,β-olefinically unsaturated carboxylic acids, and the like; polyfunctional monomers such as methylene bis-acrylamide; ethylene glycol dimethacrylate, ditheylene glycol diacrylate, divinyl benzene and allyl pentaerythritol; bis(β-haloalkyl)alkenyl phosphonates such as bis(β-chloroethyl)vinyl phosphonate; α,β-olefinically unsaturated N-alkylol amides or α,β-olefinically unsaturated N-alkoxyalkyl amide of the formula

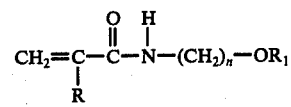

wherein R is hydrogen or an alkyl group containing from 1 to 4 carbon atoms, $R_1$ is hydrogen or an alkyl group containing from 1 to 8 carbon atoms and n is an integer from 1 to 4, including N-methylol acrylamide, N-methylol methacrylamide; amide monomers derived from an α,β-olefinically unsaturated carboxylic acid and having the structural formula

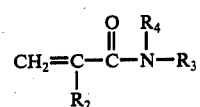

wherein $R_2$ is hydrogen or an alkyl group containing from 1 to 4 carbon atoms and $R_3$ and $R_4$ are hydrogen or a radical containing from 1 to 12 carbon atoms and more preferably an alkyl group containing from 1 to 8 carbon atoms including acrylamide and methacrylamide, N-propyl acrylamide, diacetone acrylamide and the like.

In carrying out the polymerization reaction there is used the usual catalyst or initiators which normally are free radical forming including organic peroxides and aliphatic azo compounds. Such materials include, for example, α,α'-azodiisobutyronitrile and the like; organic peroxides including diacyl peroxides such as acetyl peroxide in dimethyl phthalate, benzoyl peroxide, 2,4-dichlorobenzoyl peroxide, lauroyl peroxide, pelargonyl peroxide; peroxyesters such as esterbutyl peroxyacetate, tert-butyl peroxyisobutyrate, tert-butyl peroxypivalate, tert-butyl peroxy(2-ethyl-hexanoate); alkyl peroxides such as α,α'-bis-(t-butylperoxy)diisopropylbenzene, n-butyl-4,4-bis(tert-butylperoxy)valerate, di-tert-amyl peroxide, dicumyl peroxide, 2,5-dimethyl-2,5-bis(tert-butylperoxy)hexyne 3; hydroperoxides such as tert-butyl hydroperoxide, 1,1,3,3-tetramethyl butyl hydroperoxide, cumene hydroperoxide, 2,5-dimethylhexane-2,5-dihydroperoxide, diisopropylbenzene hydroperoxide; ketone peroxides such as methyl ethyl ketone peroxides; sulfonyl acyl peroxides such as acetyl cyclohexyl sulfonyl peroxide; acetyl sec-heptyl sulfonyl peroxide; peroxy carbonates such as tert-butylperoxy isopropyl carbonte; peroxy dicarbonates such as bis(4-t-butylcyclohexyl) peroxy dicarbonate, dicyclohexyl peroxydicarbonate, diisopropyl peroxydicarbonate; di-(2-ethyl hexyl)peroxydicarbonate, tertiary alkyl perketals such as 2,2-bis-(tert-butylperoxy)butane; mixtures thereof and the like. Often used are lauroyl peroxide, di-ethyl peroxydicarbonate, di(n-propyl)peroxydicarbonate, diisopropyl peroxydicarbonate, di(sec-butyl)-peroxydicarbonate and acetyl cyclohexane sulfonyl peroxide.

The suspending agents usually employed include partially hydrolyzed polyvinyl acetate, polyvinyl alcohol; cellulose ether; gelatin; alkyl cellulose wherein the alkyl contains 1 to 4 carbon atoms and derivatives thereof such as, hydroxy, alkyl or propyl cellulose, copolymers of vinylidene monomers containing carboxyl groups as methyl methacrylatemethacrylic acid copolymers; polyacrylic acid; small amounts of water soluble phenol-formaldehyde resins, vinyl acetatemaleic acid or styrene-maleic anhydride copolymers and the like. Other usual additives may be included as buffers, salts, modifiers and the like.

The cleaning solution is used after all polymer deposits have been removed mechanically, or by solvents. It is the basis and essence of this invention that the final cleaning prior to polymerization, and subsequent cleanings between polymerizations to prevent polymer build up, is a cleaning to remove organic contaminants adsorbed to the reactor wall and other exposed metal surfaces. A number of cleaning methods may be employed including, for example, chromic acid, ultrasonic detergent treatment, and anodic or cathodic electrolysis; but the most efficient and most practical are hot aqueous alkali-detergent solutions. Any of a great variety of alkaline or acid metal cleaning solutions may be used, so long as they remove the residual organic contaminants on the metal surfaces to produce a water wettable surface indicted by substantially less than 1° contact angle with water as shown by water wettability of the clean surface.

Particularly useful compositions are those containing an alkali metal compound as carbonates, silicates, hydroxides and phosphorous containing compounds, and detergents, suspending agents, emulsifiers and the like.

The alkali material include sodium or potassium hydroxides, carbonates, silicates and phosphates; including, for example, specifically, sodash, the sesquicarbonate of soda, condensed phosphates as tripolyphosphates, orthophosphates, metasilicates and the like. Typical examples of such materials include sodium or potassium ammonium phosphate, carbonate, carbonate, hypophosphate, dihydrogen phosphate, monohydrogen phosphate, orthophosphate, pyrophosphate, hexametaphosphate, metasilicate, disilicate, tetrasilicate and the like. The phosphates provide excellent cleaning compositions.

The surface active agents used in conjunction with the alkali compounds may be any of a great variety of materials. Anionic, non-ionic and cationic surface active agents may be employed. Anionic surface active agents include a great variety of types including sodium or potassium salts of disproportionated rosin acid soap as sodium dihydroabietate, fatty acid soaps such as sodium stearate and potassium oleate, alkali soaps of naphthenic acid, alkyl sodium sulfosuccinates and as diamyl, dihexyl and dioctyl, sodium alkyl sulfates as sodium lauryl sulfate, sulfated fatty acid amides and esters, sodium sulfates of acid esters as lauric and oleic, sodium salts of sulfonated oils, alkylaryl sulfonates such as sodium alkyl naphthalene sulfonate and sodium alkyl benzene sulfonates, sodium benzyl naphthalene sulfonate, isobutyl naphthalene sodium sulfonate, sodium naphthalene sulfonic acid condensate and the like. Non-ionic surface active agents include poly(alkoxy)non-ionics, and particularly polyethers as polyethers as poly(oxyethylene) sorbitol laurate, poly(oxyethylene)stearates, poly(oxyethylene) esters of mixed fatty and rosin acids, fatty alcohol ethylene oxide condensates, glycerol monostearate, sorbitan esters of fatty acids, diethylene glycol stearate and the like. Cationic surface active agents include quaternary ammonium salts as cetyl dimethylbenzyl ammonium chloride, amine cationic surface active agents as the monooleate of triethanolamine, primary fatty amines as stearyl amine, tertiary amine-polyoxyethylene condensate as polyoxyethylene coco amine and quaternary amines as dicoco dimethyl ammonium chloride.

Better results are obtained with anionic or nonionic surface active agents as compared to cationic surface active agents. However, the latter may be used, particularly where low foaming characteristics are desired and in conjunction with anionic and non-ionic surface active agents. Even more preferred of these two are the anionic surface active agents. In the suspension polymerization of vinylidene halide monomers, two of the most widely used suspension materials are polyvinyl alcohol (hydrolyzed polyvinyl acetate) and methyl cellulose derivatives as methocel and the like. These are often used in combination with other surfactants, particularly naturally occurring materials as gelatin, or the synthetic detergents of the alkyl benzene or naphthalene sulfonate or alkyl sulfate classes. One of the primary objectives of this invention is removal of adsorbed suspension agent from the previous polymerization from the reactor wall, particularly, for example, polyvinyl alcohol, methyl cellulose derivatives, and the like. We have found that this is most efficiently done in the shortest period of time to provide water wettable metal surfaces when alkali-alkali metal alkylaryl sulfonates are used. Of these types of materials, sodium alkyl benzene or naphthalene sulfonates are particularly useful, wherein the alkyl group contains about 8 to 18 carbon atoms, more preferably about 10 to 14 carbon atoms.

In the alkaline cleaning solutions, the amounts of necessary ingredients will be varied from about 1 to 10 weight percent, in the cleaning medium which usually is water, with the necessary ingredients being present in amount based on 100 weight parts of the alkali compound with 1/10 to less than 25 weight parts of the detergent. More preferably, the amount will be about 0.25 to 10 weight parts detergent based on 100 weight parts of alkali compound. To obtain the necessary cleaning in accordance with this invention, it is required that both the alkaline material and detergent be used in the same solution. It has been found that most alkaline materials or surfactants alone were found that most alkalie materials or surfactants alone were incapable of removing the adsorbed organic contaminants as required. 10% water solutions of trisodium phosphate, sodium carbonate, sodium tripolyphosphate, sodium metasilicate, sodium metaphosphate, 1% sodium dodecyl benzene sulfonate and 0.5% nonyl phenoxy poly(ethylenoxy)ethanol alone were completely ineffective at 90° C. for 5 minutes to remove organic contaminants from metal surfaces. In contrast, solutions containing as little as 0.05% sodium dodecyl benzene sulfonate and 4.3% trisodium phosphate, 10% sodium carbonate or 10% sodium pyrophosphate are very effective in removing organic contaminants and produce water wettable stainless steel panels. Likewise effective were solutions of 0.5% nonylphenoxy poly(ethyleneoxy)ethanol with the same amounts of inorganic materials.

To obtain full advantage of the improved process of this invention, it is necessary before using the alkali-detergent cleaning technique to first remove all visible polymer deposits on the metal reactor surfaces. This can be accomplished by any of the methods normally used by those skilled in the art as by solvent cleaning, high pressure water, mechanically as by scraping, and the like. Normally, cleaning the deposited polymer with solvent or high pressure water may then require a light abrading of the thin remaining polymer coating that then may be polished away with ordinary paste cleaners, by blasting and the like. One convenient method is salt blasting with ordinary salt, ground walnut shells and the like. In any event, once the visible polymer deposits are removed it is then necessary in accordance with this invention to remove any adsorbed organic contaminants, particularly dispersion or suspending agents from previous polymerization reactions.

In cleaning the reactors with the alkali-detergent solution after the reactor has been mechanically or solvent cleaned to remove visible polymer deposits, the cleaning solution is charged to the reactor, preferably at or heated to temperatures greater than about 60° C. and more desirable greater than 70° C, as about 80° C. up to about the boiling point of the solution. There is a readily established time/temperature relation, for example, it has been found that hot cleaning solution at 95° C. may clean the surface in periods of less than about 10 minutes, or less, and about 20 minutes at 90° C. even without agitation.

Agitation or stirring, although not essential, will reduce contact time significantly and offers better temperature control. Excellent results have been obtained with the use of small amounts of cleaning solutions sprayed continually onto the walls of a reactor for 2 to 10 minutes at 90° C. at an impingement velocity of about 150 cm/sec. The time exposure to the cleaning solution as is obvious, may be varied depending on the degree of organic adsorption on the reactor walls, but generally, about 5 to 30 minutes at 90°-95° C. with some agitation is satisfactory. At these temperatures, only 1 to 2 minutes may be required with normal reactor agitation. Thereafter the cleaning solution is discharged fromm the reactor and the reactor is rinsed with water and allowed to drain before charging the polymer ingredients. Preferably, the reactor is cleaned just prior to charging the polymerization ingredients.

In any event the cleaning is continued until the metal surface is water wettable which shows a contact angle with water of less than about 1°. Water wettability may be measured, for example, by a rather simple method, the so-called water break test found in *Metals Handbook*, 8th Edition, Volume 2, American Society for Metals, page 316. A related method is to rinse a treated panel with water which is placed in a vertical position and observed. If there is an organic material adsorbed on the surface, the water will break into droplets and drain. If there is not substantially complete removal, the surface may appear to be water wet but on slow draining the water boundary will be irregular and little or no evidence of Newton rings will be seen. If, however, substantially complete removal has been accomplished, the slow draining film will show a uniformly descending upper front with a uniform series of Newton rings as the film drains to a thickness of a few wavelengths of light. To confirm that these observations are related to a near 0° contact angle, photographs were made of draining films on clean panels, cleaned with a trisodium phosphate-sodium dodecyl benzene sulfonate solution. The spacing of the Newton rings when photographic negatives were enlarged verified that the edge of the water film gave a near 0° contact angle, that is, les than 1°.

It has been noted that the reactor walls must be substantially free of organic contaminants and it is considered that the contaminant most necessary to be removed is that adsorbed suspension or dispersion agent as from previous polymerizations. How often the reactor cleaning must be applied during subsequent polymerization reactions will depend upon the nature of the vinyl chloride polymerization medium so that each polymerization recipe must be evaluated on its own. With many polymerization recipes, it will be found necessary to use the cleaning solution after each polymerization. With more stable polymerization systems and a minimum deposit of organic contaminants on reactor surfaces, cycles as long as 5-10 charges have been observed before it was necessary to use the cleaning solution, and many polymerizations may be run before mechanical cleaning may be necessary.

To demonstrate the practice of the invention a stainless steel reactor was first thoroughly cleaned with tetrahydrofuran at 165° F. for 90 minutes to remove all visible polymer deposits from the reactor surfaces. The reactor is drained, flushed with water and purged with steam and then charged with the following recipe: vinyl chloride 100 weight parts; water 180 weight parts; polyvinyl alcohol (87-89% hydrolyzed polyvinyl acetate having a viscosity in a 45 water solution of 34-35 centipoise), 0.06 weight part; and 0.03 weight part of di(sec-butyl)peroxydicarbonate. The water is charged to the reactor and the polyvinyl alcohol dissolved therein. The reactor is then closed and evacuated and purged with nitrogen. Thereafter the vinyl chloride is charged. The agitator was started at 250 rpm and the charge heated to 56° C. The secondary-butyl peroxydicarbonate was then charged to the reactor with a water solution. After 6 hours, at substantial completion of the polymerization reaction, the reactor was cooled, vented and the charge removed. The polymerizer was washed with water and inspected. Both paper and sandy polymer build up was noted on the reactor walls after this polymerization. The reactor was cleaned again with THF as described and thereafter the reactor was filled with the cleaning solution containing 4.3 weight percent trisodium phosphate (10 percent $Na_3PO_4 . 12 H_2O$), 0.05 weight percent sodium dodecyl benzene sulfonate in water at 90° C. for 30 minutes with agitation. This solution was then drained from the reactor which was flushed with water. Water wettability of the reactor walls was noted and then did not bead up with water, showing substantial removal of any adsorbed organic material. Thereafter the above recipe charged again to the reactor. After the reaction was substantially complete and the polymer dispersion removed from the polymerizer, it was found that there was no paper build up on the reactor walls. The cleaning with alkali-detergent described above was repeated and then another polymerization charge made. This was continued until a total of 6 charges had been completed. At the end of that time the stainless steel reactor walls were still free of polymer build up. In each case, after cleaning and the reactor was washed the reactor walls were water wettable, and as the water drained it did not bead up. That the metal surface was completely water wettable, shows that substantially all of the organic contaminants adsorbed on the reactor wall had been removed.

I claim:

1. In a process for the aqueous suspension polymerization of a vinylidene halide in reactors containing metal surfaces exposed to said suspension, the improvement comprising conducting said polymerization in reactors wherein said metal surfaces are substantially free of adsorbed organic materials prior to introduction therein of said aqueous suspension into the reactor, whereby the amount of polymer build up on said metal surfaces during polymerization is substantially reduced.

2. The process of claim 1 wherein the vinylidene halide is vinyl chloride.

3. In a process for the aqueous suspension polymerization of vinyl chloride in reactors having exposed metal surface, the improvement which comprises before said polymerization, first removing any visible polymer deposits from the metal surface of said reactors and thereafter removing adsorbed organic materials on said surfaces by treating said metal surfaces with a hot alkali-surface active agent mixture.

4. The process of claim 3 wherein said metal surfaces are treated only with a hot aqueous alkali-detergent mixture after each polymerization reaction prior to a subsequent polymerization reaction.

5. The process of claim 3 wherein said alkali-detergent is a water solution containing about 1 to 25% of an alkali metal silicate, carbonate or phosphate and said detergent is selected from the group consisting of alkylaryl sulfonates and poly(alkoxy)nonionic surface active agents in amount of about 0.1 to less than 25 weight parts per 100 weight parts of said alkali compound.

6. The process of claim 5 wherein said alkali is trisodium phosphate and said detergent is a sodium alkylaryl sulfonate.

7. The process of claim 6 wherein said sulfonate is sodium dodecyl benzene sulfonate present in amount of about 0.25 to 5 weight parts per 100 weight parts of said trisodium phosphate.

8. The process of claim 5 wherein said reactor is a stainless steel reactor.

9. The process of claim 3 wherein in a series of polymerizations cyclically removing adsorbed organic materials from said metal surfaces with the hot alkali-surface active agent mixture.

10. The process of claim 1 wherein said vinylidene halide is vinyl chloride and adsorbed organic materials on said metal surfaces are removed by treating said metal surfaces with a hot alkali-surface active agent mixture as required whereby polymer build up on said metal surfaces is substantially reduced, said alkali being a sodium phosphate and said detergent being an alkali metal alkylaryl sulfonate in water.

11. The process of claim 10 wherein said adsorbed materials are polyvinyl alcohol or alkyl cellulose and derivatives thereof.

* * * * *

UNITED STATES PATENT AND TRADEMARK OFFICE
CERTIFICATE OF CORRECTION

PATENT NO. : 4,038,473
DATED : July 26, 1977
INVENTOR(S) : LOUIS COHEN

It is certified that error appears in the above-identified patent and that said Letters Patent are hereby corrected as shown below:

Column 5, line 13, delete --- [were found that most]---.

Column 5, line 14, delete --- [alkalie materials or surfactants alone] --- .

Signed and Sealed this

Second Day of May 1978

[SEAL]

Attest:

RUTH C. MASON
Attesting Officer

LUTRELLE F. PARKER
Acting Commissioner of Patents and Trademarks